(12) United States Patent
Li et al.

(10) Patent No.: US 12,129,938 B2
(45) Date of Patent: Oct. 29, 2024

(54) TUBE AND METHOD FOR MAKING SAME

(71) Applicant: SAINT-GOBAIN PERFORMANCE PLASTICS CORPORATION, Solon, OH (US)

(72) Inventors: Qiaoxi Li, Waltham, MA (US); Jessica Kenepp, Akron, OH (US); James Ludlow, Medina, OH (US); Cody Gleason, Solon, OH (US); Gayla Lyon, West Boylston, MA (US); Jiezhu Jin, Westborough, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 136 days.

(21) Appl. No.: 17/823,266

(22) Filed: Aug. 30, 2022

(65) Prior Publication Data

US 2023/0129125 A1    Apr. 27, 2023

Related U.S. Application Data

(60) Provisional application No. 63/260,766, filed on Aug. 31, 2021.

(51) Int. Cl.
    *F16L 11/12*    (2006.01)
    *F16L 11/04*    (2006.01)

(52) U.S. Cl.
    CPC ............... *F16L 11/12* (2013.01); *F16L 11/04* (2013.01)

(58) Field of Classification Search
    CPC .................................. F16L 11/12; F16L 11/04
    USPC .......................................... 138/137, 140, 141
    See application file for complete search history.

(56) References Cited

U.S. PATENT DOCUMENTS

| | | | |
|---|---|---|---|
| 5,264,539 A | 11/1993 | Shepherd | |
| 6,066,374 A * | 5/2000 | Healy | C08K 5/3475 206/524.6 |
| 6,555,190 B1 * | 4/2003 | Tsai | B32B 27/20 156/308.2 |
| 7,381,762 B2 | 6/2008 | Xia | |
| 8,088,848 B2 | 1/2012 | Denecker | |

(Continued)

FOREIGN PATENT DOCUMENTS

| | | |
|---|---|---|
| CN | 101909882 A | 12/2010 |
| CN | 103079822 A | 5/2013 |

(Continued)

OTHER PUBLICATIONS

International Search Report and Written Opinion for PCT Application No. PCT US2022/075646, dated Dec. 15, 2022, 10 pages.

*Primary Examiner* — Patrick F Brinson
(74) *Attorney, Agent, or Firm* — Abel Schillinger, LLP; Chi Suk Kim (57) ABSTRACT

A multilayer tube includes: an inner layer including a polymer, wherein the polymer includes a fluoropolymer, a polyolefin, a blend thereof, or combination thereof; and an outer layer adjacent to the inner layer, wherein the outer layer includes a polymer including a fluoropolymer, a polyolefin, a blend thereof, or combination thereof; wherein the inner layer, the outer layer, or combination thereof includes at least one blocking agent, wherein the at least one blocking agent reduces the percent transmission by at least 99% at wavelengths between 240 nm to 450 nm.

19 Claims, 5 Drawing Sheets

(56) References Cited

U.S. PATENT DOCUMENTS

| | | |
|---|---|---|
| 9,219,182 B2 | 12/2015 | Chen et al. |
| 10,266,671 B2 | 4/2019 | Watson et al. |
| 2010/0220389 A1 | 9/2010 | Villuendas Yuste et al. |
| 2010/0260991 A1 | 10/2010 | Subramanian et al. |
| 2011/0083765 A1* | 4/2011 | Stark .................. F16L 55/1654 428/476.3 |
| 2013/0126029 A1* | 5/2013 | Hummel .................. B32B 1/08 428/35.2 |
| 2013/0192755 A1 | 8/2013 | Carella et al. |
| 2014/0113997 A1 | 4/2014 | Winrow et al. |
| 2017/0261132 A1 | 9/2017 | Garver et al. |
| 2017/0368805 A1 | 12/2017 | Tazaki et al. |
| 2018/0186131 A1 | 7/2018 | Kudo et al. |
| 2019/0351658 A1 | 11/2019 | Carella et al. |
| 2019/0359783 A1 | 11/2019 | Demko |
| 2021/0146669 A1 | 5/2021 | McCauley et al. |

FOREIGN PATENT DOCUMENTS

| | | |
|---|---|---|
| CN | 103153615 A | 6/2013 |
| CN | 107110405 A | 8/2017 |
| EP | 0739379 B1 | 12/1998 |
| EP | 2731987 B1 | 10/2017 |
| EP | 3750948 A1 | 12/2020 |
| JP | 2000063680 A | 2/2000 |
| JP | 2006168350 A | 6/2006 |
| WO | 2007079246 A2 | 7/2007 |
| WO | 2008129041 A1 | 10/2008 |
| WO | 2010043665 A1 | 4/2010 |
| WO | 2016031738 A1 | 3/2016 |
| WO | 2017152685 A1 | 9/2017 |
| WO | 2021071730 A1 | 4/2021 |

* cited by examiner

TUBE AND METHOD FOR MAKING SAME

CROSS-REFERENCE TO RELATED APPLICATION(S)

This application claims priority under 35 U.S.C. § 119(e) to U.S. Provisional Patent Application No. 63/260,766, entitled "TUBE AND METHOD FOR MAKING SAME," by Qiaoxi L I et al., filed Aug. 31, 2021, which is assigned to the current assignee hereof and incorporated herein by reference in its entirety.

FIELD OF THE DISCLOSURE

This application in general, relates to a tube and a method for making a tube.

BACKGROUND

Hoses and tubing are used in a variety of industries including the digital printing industry. In such industries, certain materials may be used due to their flexibility; however, many materials have poor resistance to chemicals, and in particular, have poor ultraviolet ink resistance. Chemically resistant tubing may be used, such as those made with fluoropolymer materials, because they have a low surface energy inner surface and are resistant to contaminants. However, such fluoropolymers often have undesirable properties for certain applications since they are often rigid and have low flexibility.

Further, many ultraviolet tubes for the transfer of UV inks are opaque to provide ultraviolet resistance for the ink contained within the tube. However, it would be desirable to visually see through the tube.

As such, an improved fluid conduit would be desirable.

SUMMARY

In an embodiment, a multilayer tube includes: an inner layer including a polymer, wherein the polymer includes a fluoropolymer, a polyolefin, a blend thereof, or combination thereof; and an outer layer adjacent to the inner layer, wherein the outer layer includes a polymer including a fluoropolymer, a polyolefin, a blend thereof, or combination thereof; wherein the inner layer, the outer layer, or combination thereof includes at least one blocking agent, wherein the at least one blocking agent reduces the percent transmission by at least 99% at wavelengths between 240 nm to 450 nm.

In another embodiment, a method of forming a multilayer tube includes: providing an inner layer including a polymer, wherein the polymer includes a fluoropolymer, a polyolefin, a blend thereof, or combination thereof; and providing an outer layer adjacent to the inner layer, wherein the outer layer includes a polymer comprising a fluoropolymer, a polyolefin, a blend thereof, or combination thereof; wherein the inner layer, the outer layer, or combination thereof includes at least one blocking agent, wherein the at least one blocking agent reduces the percent transmission by at least 99% at wavelengths between 240 nm to 450 nm.

In a particular embodiment, a tube includes: at least one layer including a polymer and at least one blocking agent, wherein the polymer includes a fluoropolymer, a polyolefin, a blend thereof, or combination thereof and wherein the at least one blocking agent reduces the percent transmission by at least 99% at wavelengths between 240 nm to 450 nm.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises", "comprising", "includes", "including", "has", "having" or any other variation thereof, are open-ended terms and should be interpreted to mean "including, but not limited to . . . " These terms encompass the more restrictive terms "consisting essentially of" and "consisting of." In an embodiment, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts. Unless indicated otherwise, all measurements are at about 23° C.+/−5° C. per ASTM, unless indicated otherwise.

In a particular embodiment, a tube is provided. In an embodiment, the tube includes at least one layer. In a particular embodiment, the tube is a multilayer tube having least an inner layer and an outer layer. In an embodiment, the at least one layer includes a fluoropolymer, a polyolefin, a blend thereof, or combination thereof. For instance, when the tube is a multilayer tube, the inner layer includes a fluoropolymer, a polyolefin, a blend thereof, or combination thereof. The outer layer is adjacent to the inner layer and includes a fluoropolymer, a polyolefin, a blend thereof, or combination thereof. Further, the at least one layer of the tube comprises at least one blocking agent, wherein the at least one blocking agent reduces the percent transmission by at least 90%, such as at least 95%, such as at least 99% at wavelengths between 240 nanometers (nm) to 450 nm. Advantageously, the tube has properties for applications that include exposure to chemical solutions. A method of forming a tube is further provided.

An exemplary fluoropolymer of the tube, such as an inner layer, outer later, or combination thereof, may be formed of a homopolymer, copolymer, terpolymer, or polymer blend formed from a monomer. In an embodiment, the fluoropolymer includes at least one monomer unit, including, for example, tetrafluoroethylene, hexafluoropropylene, chlorotrifluoroethylene, trifluoroethylene, vinylidene fluoride, vinylidene difluoride, vinyl fluoride, perfluoropropyl vinyl ether, perfluoromethyl vinyl ether, or combination thereof, and optionally, at least one of ethylene, propylene, or any combination thereof. An exemplary fluoropolymer includes at least three monomer units, wherein the monomer units include vinylidene fluoride, hexafluoropropylene, tetrafluoroethylene, perfluoromethylvinyl ether, ethylene, or combination thereof.

In an embodiment, the fluoropolymer includes a terpolymer of tetrafluoroethylene (TFE), hexafluoropropylene, and vinylidene fluoride. In another embodiment, the fluoropolymer includes a tetrapolymer of tetrafluoroethylene (TFE), hexafluoropropylene, vinylidene fluoride, and ethylene. In a particular example, the vinylidene fluoride is present at an amount of less than about 50% by weight, such as less than about 40% by weight, such as less than about 30% by weight, or even less than about 20% by weight of the total weight of the fluoropolymer. In an embodiment, the tetrafluoroethylene is present at an amount of greater than about 30% by weight, such as greater than about 40% by weight, such as greater than about 50% by weight, or even greater than about 60% by weight of the total weight of the fluoropolymer.

In an embodiment, the fluoropolymer includes a block copolymer including at least one hard segment and at least one soft segment. The at least one hard segment and the at least one soft segment may include any of the monomers described above. Examples of the block copolymer including the at least one hard segment is composed of monomer units of tetrafluoroethylene, ethylene, and hexafluoropropylene and the at least one soft segment is composed of monomer units of vinylidene fluoride, hexafluoropropylene, and tetrafluoroethylene. In an embodiment, the hard segment contains greater than 5% moles of ethylene, or even greater than 10% moles of ethylene. In an embodiment, the soft segment contains greater than 5% moles of vinylidene fluoride, or even greater than 10% moles of vinylidene fluoride. Any ratio of the hard segment to the soft segment is envisioned. In an embodiment, the weight ratio of the hard segment to the soft segment is 1:1 to 1:10. It will be appreciated that the ratio can be within a range between any of the minimum and maximum values noted above. In an exemplary embodiment, the durometer of the block copolymer is less than 70 shore A, such as less than 65 shore A, as measured by ASTM D2240. The melting point of the hard segment phase is less than 270° C., such as less than 260° C. Elongation at break is greater than 300%, such as greater than 400%, as measured by ASTM D412.

Typically, any nominal fluorine content is envisioned for the fluoropolymer such as at least 60 weight %, such as at least 67 weight %, such as at least 70 weight %, or even at least 73 weight %. For instance, the fluoropolymer has a nominal fluorine content of 60 weight % to 80 weight %, or even about 60 weight % to about 70 weight %. In an embodiment, the fluoropolymer has a nominal fluorine content of 70 weight % to 80 weight %. In an embodiment, the fluoropolymer has a crystallinity of less than about 50%, such as less than about 30%, or even less than about 10%. For instance, the fluoropolymer has a crystallinity of less than about 50%, such as less than about 30%, or even less than about 10%. Advantageously, the limited crystallinity provides a fluoropolymer with flexibility and elastic recovery desirable for ultraviolet ink applications.

The fluoropolymer of the at least one layer typically is a flexible material. For instance, the fluoropolymer has a flexural modulus of less than about 75 MPa, such as less than about 70 MPa, such as a flexural modulus of about 20 MPa to about 70 MPa, such as about 20 MPa to about 50 MPa as measured by ASTM D790. In an embodiment, the fluoropolymer has a flexural modulus of less than about 40 MPa, such as about 20 MPa to about 40 MPa as measured by ASTM D790. In an embodiment, the fluoropolymer has an elongation at yield of greater than about 5%, such as greater than about 7%, such as greater than about 8%, or even greater than about 10% as measured by ASTM D790. It will be appreciated that the flexural modulus and elongation at yield can be within a range between any of the minimum and maximum values noted above.

In an embodiment, the tube may include at least one layer including a polyolefin. For instance, the inner layer, the outer layer, or combination thereof may be a polyolefin. In an example, the polyolefin may include a homopolymer, a copolymer, a terpolymer, an alloy, or any combination thereof formed from a monomer including a C2-C10 alkene. In an embodiment, the polyolefin includes, for example, ethylene, propylene, butene, pentene, methyl pentene, octene, or any combination thereof. An exemplary polyolefin includes high density polyethylene (HDPE), medium density polyethylene (MDPE), low density polyethylene (LDPE), ultra or very low density polyethylene (VLDPE), ethylene propylene copolymer, ethylene butene copolymer, polypropylene (PP), polybutene, polybutylene, polypentene, polymethylpentene, polystyrene, ethylene propylene rubber (EPR), ethylene octene copolymer, blend thereof, mixture thereof, and the like. The polyolefin further includes any olefin-based random copolymer, olefin-based impact copolymer, olefin-based block copolymer, olefin-based specialty elastomer, olefin-based specialty plastomer, metallocene-based olefin, blend thereof, mixture thereof, and the like. In a particular embodiment, the polyolefin includes a high density polyethylene, an ultra low density polyethylene, a polyethylene copolymer, a branched polyolefin copolymer, a polypropylene, a blend thereof, or combination thereof. In an embodiment, the polyethylene copolymer includes at least one monomer unit, or even two monomer units of monomers including C2-C10 alkenes interspersed along a polymer backbone. In a particular embodiment, the polyethylene copolymer includes monomer units of ethylene and octene. A "branched polyolefin copolymer" as used herein refers to a polyolefin that includes at least one monomer unit, or even two monomer units including monomers including C2-C10 alkenes wherein one monomer unit provides a polymer backbone that also has secondary polymer chains formed from at least a second monomer unit linked to the polymer backbone. In an embodiment, the polyolefin may include an acrylic acid, a vinyl acetate, an ionomer, or combination thereof.

In a particular embodiment, the polyolefin is blended with a diene elastomer. The diene elastomer may be a copolymer formed from at least one diene monomer. For example, the diene elastomer may be a copolymer of ethylene, propylene and diene monomer (EPDM), a thermoplastic EPDM composite, or combination thereof. An exemplary diene monomer may include a conjugated diene, such as butadiene, isoprene, chloroprene, or the like; a non-conjugated diene including from 5 to about 25 carbon atoms, such as 1,4-pentadiene, 1,4-hexadiene, 1,5-hexadiene, 2,5-dimethyl-1,5-hexadiene, 1,4-octadiene, or the like; a cyclic diene, such as cyclopentadiene, cyclohexadiene, cyclooctadiene, dicyclopentadiene, or the like; a vinyl cyclic ene, such as 1-vinyl-1-cyclopentene, 1-vinyl-1-cyclohexene, or the like; an alkylbicyclononadiene, such as 3-methylbicyclo-(4,2,1)-nona-3,7-diene, or the like; an indene, such as methyl tetrahydroindene, or the like; an alkenyl norbornene, such as 5-ethylidene norbornene, 5-butylidene-2-norbornene, 2-methallyl-5-norbornene, 2-isopropenyl-5-norbornene, 5-(1,5-hexadienyl)-2-norbornene, 5-(3,7-octadienyl)-2-norbornene, or the like; a tricyclodiene, such as 3-methyltricyclo (5,2,1,0$^2$,6)-deca-3,8-diene or the like; or any combination thereof. In an embodiment, the polyolefin includes a block copolymer including at least one hard phase matrix with at least one soft phase dispersed within the hard phase matrix. In a particular embodiment, the polyolefin includes a polypropylene hard phase matrix with a cross-linked ethylene, propylene and diene monomer (EPDM) soft phase.

The polyolefin typically is a flexible material. For instance, the polyolefin has a flexural modulus of less than about 75 MPa, such as less than about 70 MPa, such as a flexural modulus of about 20 MPa to about 70 MPa, such as about 20 MPa to about 50 MPa as measured by ASTM D790. In an embodiment, the polyolefin has a flexural modulus of less than about 40 MPa, such as about 20 MPa to about 40 MPa as measured by ASTM D790. In an embodiment, the polyolefin has an elongation at yield of greater than about 5%, such as greater than about 7%, such as greater than about 8%, or even greater than about 10% as measured by ASTM D790. It will be appreciated that the flexural modulus and elongation at yield can be within a range between any of the minimum and maximum values noted above.

At least one layer of the tube includes the at least one blocking agent. In an embodiment, the at least one blocking agent may be included in the inner layer, the outer layer, or combination thereof. Any block agent is envisioned. Typically, the at least one blocking agent is a combination of the ultraviolet block agent and the visible light blocking agent to provide for the reduction in percent transmission through the tube. "Blocking" as used herein refers to reducing the percent transmission of light at a certain wavelength range. This may be achieved through light absorption, reflection, scattering, or a combination thereof. Blocking agents may be organic or inorganic, and may be dissolved dyes or a suspension of particles. In an embodiment, the at least one blocking agent reduces the percent transmission through the tube by at least 99% at wavelengths between 240 nm to 450 nm. In an embodiment, the at least one blocking agent includes an ultraviolet blocking agent, a visible light blocking agent, or combination thereof. Any combination of ultraviolet blocking agent and visible light blocking agent may be present in the inner layer, the outer layer, or combination thereof, depending on the properties desired for the final tube. In an embodiment, the outer layer includes the at least one blocking agent and the inner layer is substantially free of the at least one blocking agent. In another example, the inner layer includes the at least one blocking agent and the outer layer is substantially free of the at least one blocking agent. "Substantially free" as used herein refers to less than about 1.0% by weight, or even less than about 0.1% by weight of the total weight of the individual layer.

Any ultraviolet blocking agent is envisioned that prevents transmission of wavelengths in the ultraviolet range. For instance, the UV range is generally 100 nm to 400 nm, with UVA from 315 nm to 400 nm, UVB from 280 nm to 315 nm, and UVC from 100 nm to 280 nm. It will be appreciated that any ultraviolet blocking agent is envisioned that blocks wavelengths within any range between any of the minimum and maximum values noted. In an embodiment, the ultraviolet blocking agent includes a benzophenone, a benzotriazole, a triazine, an oxanilide, a cyranoacrylate, a metal oxide, or combination thereof. For instance, the ultraviolet blocking agent includes, but is not limited to 2,2'-methylenebis[6-(2H-benzotriazol-2-yl)-4-(1,1,3,3-tetramethylbutyl)phenol]; N-(2-Ethoxyphenyl)-N'-(4-ethylphenyl)-ethylene diamide; 2-(2H-benzotriazol-2-yl)-4,6-bis(1-methyl-1-phenylethyl)phenol; 2-(4,6-diphenyl-1,3,5-triazin-2-yl)-5-((hexyl)oxy)phenol: 2-hydroxyphenyl-s-triazine derivative; 1,3-bis-((2'-cyano-3',3'-diphenylacryloyl)oxy)-2,2-bis-(((2'-cyano-3',3'-diphenylacryloyl)oxy)methyl)-propane; 2-hydroxy-4-n-octoxybenzophenone; tetra-ethyl-2,2'-(1,4-phenylene-dimethylidene)-bismalonate; 2-tert-butyl-6-(5-chloro-2H-benzotriazol-2-yl)4-methyl-phenone; 2-[2H-benzotriazol-2-yl]-4,6-bis(1-methyl-1-phenylethyl)-phenol; 2,2',4,4'-tetrahydroxybenzo-phenone; or combination thereof. Exemplary metal oxides as an ultraviolet blocking agent include zinc oxide, titanium oxide, cerium oxide, or combinations thereof.

Any visible light blocking agent is envisioned that prevents transmission of wavelengths in the visible light range. The visible light range is typically from about 400 nm to 800 nm. It will be appreciated that any visible light blocking agent is envisioned that blocks wavelengths within any range between any of the minimum and maximum values noted. Exemplary visible light blocking agents include an anthroquinone, a benzanthrone, a perinone, a xanthene, an inorganic pigment, a dye, or combination thereof. Dyes and/or pigments include, but are not limited to red, yellow, orange dyes or pigments, or combination thereof. Inorganic pigments, include any reasonable inorganic pigment such as, for example an oxide, a sulfide, the like, or combination thereof. In particular, a dye is typically a small molecule that dissolves in the polymer, versus a pigment which is a particle, and in some instances, a nanoparticle, that is suspended in the polymer.

When the blocking agent is dispersed in a fluoropolymer, the blocking agent has a degradation temperature of greater than 300° C. For instance, the at least one block agent does not degrade during the processing conditions of the fluoropolymer.

In a further embodiment, any layer of the tube may include any additive envisioned. For instance, the inner layer, outer layer, or combination thereof may include any additive envisioned. The additive may include, for example, a curing agent, an antioxidant, a filler, an ultraviolet (UV) agent, a dye, a pigment, an anti-aging agent, a plasticizer, the like, or combination thereof. In an embodiment, the curing agent is a cross-linking agent provided to increase and/or enhance crosslinking of one or more layers. In a further embodiment, the use of a curing agent may provide desirable properties such as decreased permeation of small molecules and improved elastic recovery of the layer compared to a layer that does not include a curing agent. Any curing agent is envisioned such as, for example, a dihydroxy compound, a diamine compound, an organic peroxide, a sulfur compound, or combination thereof. An exemplary dihydroxy compound includes a bisphenol AF. An exemplary diamine compound includes hexamethylene diamine carbamate. In an embodiment, the curing agent is an organic peroxide. Any amount of curing agent is envisioned. Alternatively, one or more layers may be substantially free of crosslinking agents, curing agents, photoinitiators, fillers, plasticizers, or a combination thereof. "Substantially free" as used herein refers to less than about 1.0% by weight, or even less than about 0.1% by weight of the total weight of the individual layer.

In an example, the at least one layer may consist essentially of a polymer and the at least one blocking agent. In an example, the polymer for the at least one layer may consist essentially of the fluoropolymer, the polyolefin, or combination thereof. In an example, the fluoropolymer may consist essentially of a tetrafluoroethylene (TFE), hexafluoropropylene, vinylidene fluoride, and optionally, ethylene. In an example, the polyolefin may consist essentially of at least an ethylene monomer unit. In an embodiment, the polyolefin may consist essentially of an ultra low density polyethylene, an ethylene octene copolymer, a branched copolymer, or combination thereof. As used herein, the phrase "consists essentially of" used in connection with the polymer of the at least one layer precludes the presence of monomers and polymers that affect the basic and novel characteristics of the polymer, although, commonly used processing agents and additives such as antioxidants, fillers, UV agents, dyes, pigments, anti-aging agents, and any combination thereof may be used in the polymer.

In an example, the at least one layer may consist of a polymer and the at least one blocking agent. In an example, the polymer for the at least one layer may consist of the fluoropolymer, the polyolefin, or combination thereof. In an example, the fluoropolymer may consist of a tetrafluoroethylene (TFE), hexafluoropropylene, vinylidene fluoride, and optionally, ethylene. In an example, the polyolefin may consist of at least an ethylene monomer unit. In an embodiment, the polyolefin may consist of an ultra low density polyethylene, an ethylene octene copolymer, a branched copolymer, or combination thereof.

In a particular embodiment, the tube has a desirable hardness. In an embodiment, the hardness of the tube is a shore A of less than about 95, such as about 20 to about 90, such as about 40 to about 90, such as about 40 to about 80, or even about 40 to about 65 as measured by ASTM D2240. In an embodiment, the tube is a multilayer tube wherein the inner layer has a shore A hardness of less than about 95, such as about 20 to about 90, such as about 40 to about 90, such as about 40 to about 80, or even about 40 to about 65 as measured by ASTM D2240. In an embodiment, the tube is a multilayer tube wherein the outer layer has a shore A hardness of less than about 95, such as about 20 to about 90, such as about 40 to about 90, such as about 40 to about 80, or even about 40 to about 65 as measured by ASTM D2240. It will be appreciated that the hardness can be within a range between any of the minimum and maximum values noted above. In an embodiment, a multilayer tube may have an outer layer that has a shore hardness less than the shore hardness of the inner layer. In another embodiment, a multilayer tube may have an outer layer that has a shore hardness greater than the shore hardness of the inner layer. In yet another embodiment, a multilayer tube may have an outer layer that has a shore hardness that is the same as the shore hardness of the inner layer.

The tube may further include a tie layer adjacent to the inner layer and the outer layer. In an exemplary embodiment, the tie layer includes a polymer such as a thermoplastic material or a thermoset material. For instance, the tie layer may include an acrylate, an epoxy, an ester, an ethylene, amine, amide, tetrafluoroethylene (TFE), vinylidene fluoride (VDF), hexafluoropropylene (HFP), perfluorovinyl ether, a polyurethane, a styrene-block copolymer, an acrylic acid, a vinyl acetate, an ionomer, a blend thereof, or combination thereof. In an embodiment, the tie layer includes at least one monomer unit including an acrylate, an ethylene, or combination thereof.

The tie layer may further include an adhesion promoter added to the polymer of the tie layer to increase the adhesion of the tie layer to at least one layer it is directly adjacent to such as, for example, the outer layer, the inner layer, or combination thereof. For instance, the adhesion promoter includes an adhesion promoter, the adhesion promoter comprising a maleic anhydride grafted PVDF, a silane-based adhesion promoter, an epoxy-based chemical, an EVOH, acrylate polymer, an acrylate copolymer, an acetal copolymer, a thermoplastic with high polarity, or combination thereof.

In an exemplary embodiment, the polymer of the tie layer may further include any reasonable additive such as a crosslinking agent, a co-agent, a photoinitiator, a filler, a plasticizer, or any combination thereof. Any co-agent is envisioned that increases and/or enhances crosslinking of the polymer composition of the tie layer. In a further embodiment, the use of a co-agent may provide desirable properties such as decreased permeation of small molecules and improved elastic recovery of the tie layer compared to a tie layer that does not include a co-agent. Any co-agent is envisioned such as, for example, bis-phenol AF, triaryl isocyanurate (TAIL), Triaryl cyanurate (TAC), an organic peroxide, or combination thereof. Any reasonable amount of co-agent is envisioned. Alternatively, the tie layer may be substantially free of crosslinking agents, co-agents, photoinitiators, fillers, plasticizers, or a combination thereof. "Substantially free" as used herein refers to less than about 1.0% by weight, or even less than about 0.1% by weight of the total weight of the polymer of the tie layer.

Figure 1:
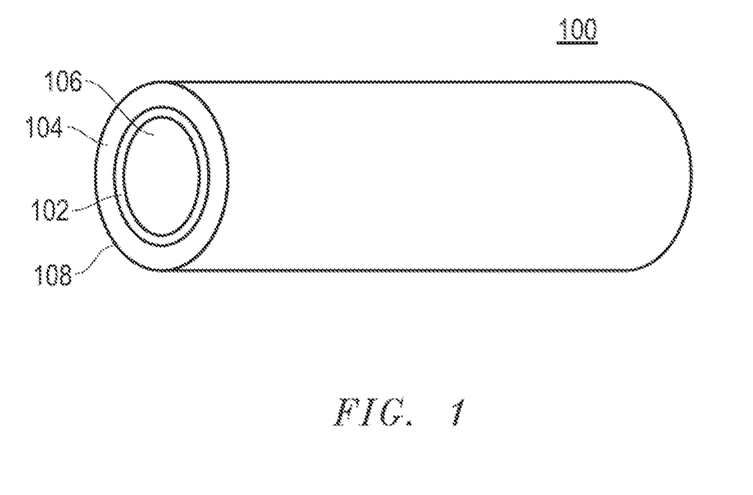
FIG. 1 includes an illustration of an exemplary multilayer tube.

In an example, FIG. 1 includes an illustration of an exemplary multilayer tube 100 that has two layers. For example, an inner layer 102 may be bonded to an outer layer 104. In particular, the inner and outer layers (102, 104) are in direct contact absent any intervening layers, such as a tie layer. Inner layer 102 has an inner lumen 106 that defines a passage for fluid to flow through. Inner layer 102 is typically a fluoropolymer, a polyolefin, or combination thereof and outer layer 104 is typically a fluoropolymer, a polyolefin, or combination thereof as described above. Inner layer 102 and outer layer 104 may be the same or different polymer materials. Further, inner layer 102 and outer layer 104 may include the same or different at least one blocking agent. The materials chosen for the inner layer 102 and outer layer 104 are dependent on the final properties desired for the multilayer tube 100.

Returning to FIG. 1, the inner layer 102 is thinner than the outer layer 104. For example, the total thickness of the layers of the multilayer tube 100 may be at least 3 mils to about 1000 mils, such as about 3 mils to about 500 mils, or even about 3 mils to about 100 mils. In an embodiment, the inner layer 102 has a thickness in a range of about 0.1 mil to about 100 mil, such as a range of about 0.5 mil to about 100 mil, such as a range of about 1 mil to about 100 mil, such as a range of about 1 mil to about 50 mil, such as a range of about 1 mil to about 10 mil, or even a range of about 1 mil to about 2 mil. The outer layer 104 and optionally other layers may make up the difference. In an example, the outer layer 104 may have a thickness in a range of about 0.1 mils to about 100 mils, such as a range of about 1 mil to about 100 mil, such as a range of about 2 mil to about 50 mils, or even a range of about 5 mil to about 50 mil. In a further example, the ratio of the thickness of the outer layer 104 relative to the thickness of the inner layer 102 is at least about 1.0, such as at least about 1.5, such as at least about 2.0, such as at least about 5.0, or even at least about 10.0. It will be appreciated that the thickness values can be within a range between any of the minimum and maximum values noted above.

In an embodiment, at least one layer may be treated to improve adhesion between the inner layer 102 and the outer layer 104. Any treatment is envisioned that increases the adhesion between two adjacent layers. For instance, a surface of the inner layer 102 that is directly adjacent to the outer layer 104 is treated. Further, a surface of the outer layer 104 that is directly adjacent to the inner layer 102 is treated. In an embodiment, the treatment may include surface treatment, chemical treatment, sodium etching, use of a primer, or any combination thereof. In an embodiment, the treatment may include corona treatment, UV treatment, electron beam treatment, flame treatment, scuffing, sodium naphthalene surface treatment, or any combination thereof.

In an embodiment, any post-cure steps may be envisioned. In particular, the post-cure step includes any thermal treatment, radiation treatment, or combination thereof. Any thermal conditions are envisioned. In an embodiment, the post-cure step includes any radiation treatment such as, for example, e-beam treatment, gamma treatment, or combination thereof. In an example, the gamma radiation or ebeam radiation is at about 0.1 MRad to about 100 MRad, such as about 0.1 MRad to 50 MRad, or even about 1 MRad to 20 MRad. In a particular embodiment, the post-cure step may be provided to eliminate any residual volatiles, increase interlayer and/or intralayer crosslinking, or combination thereof.

In an example, when the tube is a multilayer tube, the polymer of the outer layer has further desirable properties. For instance, the polymer of the outer layer has a much higher flexibility than the inner layer as defined by a combination of durometer (or hardness), tensile strength, elongation, and flexibility tests.

While two layers are illustrated in FIG. 1, the multilayer tube 100 may further include additional layers (not illustrated). Any additional layer may be envisioned such as a tie layer, an elastomeric layer, a reinforcement layer, or any combination thereof. Any position of the additional layer with respect to the inner layer and outer layer is envisioned. For instance, any additional layer may be disposed on surface 108 of the outer layer 104. In an example, an additional layer such as a reinforcement layer (not shown) may be incorporated within or between additional layers disposed in proximity to surface 108 of the outer layer 104. An exemplary reinforcement layer may include a wire, a fiber, a fabric, such as a woven fabric, a braid, or any combination thereof, formed of a material such as polyester, an adhesion modified polyester, a polyamide, a polyaramid, a glass, a metal, or a combination thereof. In an embodiment, the multilayer tube consists of the inner layer and the outer layer as described. In another embodiment, the tube is a single layer.

In a particular embodiment, the multilayer tube, such as a fluid conduit is formed by providing the inner layer and applying the outer layer to directly contact the bond surface of the inner layer, such as without intervening adhesive or bond enhancing layers. The polymer of the inner layer may be provided by any method envisioned and is dependent upon the polymer chosen for the inner layer. In an embodiment, the polymer is melt processable. "Melt processable" as used herein refers to a polymer that can melt and flow to extrude in any reasonable form such as films, tubes, fibers, molded articles, or sheets. For instance, the melt processable polymer rubber is a flexible material. In an embodiment, the polymer is extruded, injection molded, or mandrel wrapped. In an exemplary embodiment, the polymer of the inner layer is extruded. In an example, the bond surface of the inner layer is prepared with a surface treatment. In an embodiment, the polymer may be cured before, after, or during application of any further layers on the multilayer tube. The inner layer may be cured in place using a variety of curing techniques such as via heat, radiation, or any combination thereof. Curing may provide a crosslinked polymer inner layer. For instance, when cured, a chemical moiety of the monomer units of the polymer may form bonds with the polymer of the outer layer.

The outer layer includes a polymer as described above. The polymer may be provided by any method envisioned and is dependent upon the polymer chosen for the outer layer. The method may further include providing the outer layer by any method. Providing the outer layer depends on the polymer material chosen for the outer layer. In an embodiment, the outer layer is a "melt processable" polymer. "Melt processable polymer" as used herein refers to a polymer that can melt and flow to extrude in any reasonable form such as films, tubes, fibers, molded articles, or sheets. In an embodiment, the outer layer is extruded or injection molded. In an exemplary embodiment, the outer layer may be extruded. In a particular embodiment, the outer layer is extruded over the inner layer and the outer layer is cured. The outer layer may be cured in place using a variety of curing techniques such as via heat, radiation, or any combination thereof. Curing may provide a crosslinked polymer outer layer. For instance, when cured, a chemical moiety of the monomer units of the outer layer can form bonds with the polymer of the inner layer.

In an embodiment, the inner layer and the outer layer are co-extruded. Advantageously, the inner layer and the outer layer may also be cured at the same time, which may enhance the adhesive strength between the two layers. In particular, the inner layer and the outer layer have cohesive strength between the two layers, i.e. cohesive failure occurs wherein the structural integrity of the inner layer and/or the outer layer fails before the bond between the two materials fails.

In an embodiment, when present, the tie layer is typically provided by any method envisioned and is dependent upon the material chosen for the tie layer. For instance, the tie layer may be extruded. In an embodiment, the tie layer is provided by heating the polymer to an extrusion viscosity and then extruding the polymer. In a particular embodiment, the tie layer is extruded to directly contact the inner layer. In an embodiment, any combination of the inner layer, the tie layer, and the outer layer may be co-extruded.

Advantageously, the inner layer, optional tie layer, and the outer layer may also be bonded together (e.g. coextruded) at the same time, which may enhance the adhesive strength between the layers. In particular, the inner layer and the outer layer have cohesive strength between the two layers, i.e. cohesive failure occurs wherein the structural integrity of the inner layer and the outer layer fails before the bond between the two materials fails. In another particular embodiment, the inner layer, the tie layer, and the outer layer have cohesive strength between the three layers, i.e. cohesive failure occurs wherein the structural integrity of the inner layer, tie layer, and the outer layer fails before the bond between the three materials fails. In a particular embodiment, the adhesive strength between the inner layer and the tie layer is cohesive. In an embodiment, the adhesive strength between the tie layer and the outer layer is cohesive.

Although generally described as a tube, any reasonable polymeric article can be envisioned. The polymeric article may alternatively take the form of a film, a washer, or a fluid conduit. For example, the polymeric article may take the form or a film, such as a laminate, or a planar article, such as a septa or a washer. In another example, the polymeric article may take the form of a fluid conduit, such as tubing, a pipe, a hose or more specifically flexible tubing, an ink transfer tube, transfer tubing, pump tubing, chemical resistant liquid transfer tubing, warewash tubing, laundry tubing, high purity tubing, smooth bore tubing, or any combination thereof. In a particular embodiment, the tube can be used as tubing or hosing where chemical resistance and flexibility is desired.

Tubing includes an inner surface that defines a central lumen of the tube. For instance, tubing may be provided that has any useful diameter size for the particular application chosen. In an embodiment, the tubing may have an outside diameter (OD) of up to about 5.0 inches, such as about 0.25 inch, 0.50 inch, and 1.0 inch. In an embodiment, the tubing may have an inside diameter (ID) of about 0.03 inches to about 4.00 inches, such as about 0.06 inches to about 1.00 inches. It will be appreciated that the inside diameter can be within a range between any of the minimum and maximum values noted above.

In an embodiment, the resulting tube may have further desirable physical and mechanical properties. In an embodiment, the layer that is in contact with the fluid, such as the inner layer, may be particularly suited with a desirable resistance to a variety of chemical solutions. For instance, the inner layer has a weight change in a chemical solution of no greater than 20%, or even no greater than 15% under soak conditions of 28 days at 40° C. Chemical solutions include, for example, a monomer, a diluent, an ink formulation, or combination thereof. Exemplary chemical solutions include, for example, a low viscosity diluent, a small monomer diluent, an ink formulation, or combination thereof. Any small monomer diluent is envisioned and includes but is not limited to, isobornyl acrylate (IBOA), 1,6-hexanediol diacrylate (HDDA), N-vinyl caprolactam (VCAP), 4-acryloylmorpholine (ACMO), vinyl methyl oxazolidinone (VMOX), 2-(2-vinyloxyethyoxy)ethyl acrylate (VEEA), or combination thereof. "Low viscosity" as used herein refers to a dynamic viscosity of 2 mPa*s to about 15 mPa*s measured between 20° C. and 40° C. via a rotational rheometer.

In an embodiment, the tubes are kink-resistant and appear transparent or at least translucent. In a particular embodiment, the tube has desirable flexibility and substantial clarity or translucency. For example, the tube with desirable flexibility has a bend radius of at least 0.5 inches. Force to bend for the tube is at least 3 (N) Newtons, such as at least 5 N, such as at least 7 N, or even at least 10 N. In an embodiment, the tube has a transparency to visualize fluid flow through the tube. In an embodiment, the transparency is greater than about 50%, such as greater than 60%, or even greater than 70%, based on percent transmission of a light having a wavelength of 500 nanometers passing through a 1 mm thick sample. In an embodiment, the transmission is at least 80% at wavelength from about 600 nm to 800 nm. In another embodiment, the tube is opaque with desirable flexibility.

Applications for the tubing are numerous. In an exemplary embodiment, the tubing may be used in applications such digital print equipment, household wares, industrial, wastewater, automotive, or other applications where chemical resistance, UV and visible light resistance, and/or flexibility are desired.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Embodiment 1. A multilayer tube includes: an inner layer including a polymer, wherein the polymer includes a fluoropolymer, a polyolefin, a blend thereof, or combination thereof; and an outer layer adjacent to the inner layer, wherein the outer layer includes a polymer including a fluoropolymer, a polyolefin, a blend thereof, or combination thereof; wherein the inner layer, the outer layer, or combination thereof includes at least one blocking agent, wherein the at least one blocking agent reduces the percent transmission by at least 99% at wavelengths between 240 nm to 450 nm.

Embodiment 2. A method of forming a multilayer tube includes: providing an inner layer including a polymer, wherein the polymer includes a fluoropolymer, a polyolefin, a blend thereof, or combination thereof; and providing an outer layer adjacent to the inner layer, wherein the outer layer includes a polymer comprising a fluoropolymer, a polyolefin, a blend thereof, or combination thereof; wherein the inner layer, the outer layer, or combination thereof includes at least one blocking agent, wherein the at least one blocking agent reduces the percent transmission by at least 99% at wavelengths between 240 nm to 450 nm.

Embodiment 3. The multilayer tube or the method of forming the multilayer tube of any of the preceding embodiments, wherein the fluoropolymer includes at least one monomer unit including tetrafluoroethylene, hexafluoropropylene, chlorotrifluoroethylene, trifluoroethylene, vinylidene fluoride, vinylidene difluoride, vinyl fluoride, perfluoropropyl vinyl ether, perfluoromethyl vinyl ether, or combination thereof; and optionally at least one of ethylene, propylene, or any combination thereof.

Embodiment 4. The multilayer tube or the method of forming the multilayer tube of any of the preceding embodiments, wherein the fluoropolymer includes at least three monomer units, wherein the monomer units include vinylidene fluoride, hexafluoropropylene, tetrafluoroethylene, perfluorovinyl ether, ethylene, or combination thereof.

Embodiment 5. The multilayer tube or the method of forming the multilayer tube of embodiment 4, wherein the fluoropolymer includes a terpolymer of tetrafluoroethylene (TFE), hexafluoropropylene, and vinylidene fluoride.

Embodiment 6. The multilayer tube or the method of forming the multilayer tube of embodiment 5, wherein the vinylidene fluoride is present at an amount of less than about 50% by weight, such as less than about 40% by weight, such as less than about 30% by weight, or even less than about 20% by weight of the total weight of the fluoropolymer.

Embodiment 7. The multilayer tube or the method of forming the multilayer tube of embodiment 5, wherein the tetrafluoroethylene is present at an amount of greater than about 30% by weight, such as greater than about 40% by weight, such as greater than about 50% by weight, or even greater than about 60% by weight of the total weight of the fluoropolymer.

Embodiment 8. The multilayer tube or the method of forming the multilayer tube of embodiment 4, wherein the fluoropolymer includes a tetrapolymer of tetrafluoroethylene (TFE), hexafluoropropylene, vinylidene fluoride, and ethylene.

Embodiment 9. The multilayer tube or the method of forming the multilayer tube of any of the preceding embodiments, wherein the fluoropolymer has a flex modulus of less than about 40 MPa.

Embodiment 10. The multilayer tube or the method of forming the multilayer tube of any of the preceding embodiments, wherein the polyolefin includes a monomer including a C2-C10 alkene.

Embodiment 11. The multilayer tube or the method of forming the multilayer tube of embodiment 10, wherein the polyolefin includes a high density polyethylene, an ultra low density polyethylene, a polyethylene copolymer, a branched polyolefin copolymer, a polypropylene, a blend thereof, or combination thereof.

Embodiment 12. The multilayer tube or the method of forming the multilayer tube of embodiment 10, wherein the polyolefin is blended with a diene elastomer.

Embodiment 13. The multilayer tube or the method of forming the multilayer tube of any of the preceding embodiments, wherein the at least one blocking agent includes an ultraviolet blocking agent, a visible light blocking agent, or combination thereof.

Embodiment 14. The multilayer tube or the method of forming the multilayer tube of embodiment 13, wherein the ultraviolet blocking agent includes a benzophenone, a benzotriazole, a triazine, an oxanilide, a cyranoacrylate, a metal oxide, or combination thereof.

Embodiment 15. The multilayer tube or the method of forming the multilayer tube of embodiment 14, wherein the ultraviolet blocking agent comprises 2,2'-methylenebis[6-(2H-benzotriazol-2-yl)-4-(1,1,3,3-tetramethylbutyl)phenol]; N-(2-Ethoxyphenyl)-N'-(4-ethylphenyl)-ethylene diamide; 2-(2H-benzotriazol-2-yl)-4,6-bis(1-methyl-1-phenylethyl) phenol; 2-(4,6-diphenyl-1,3,5-triazin-2-yl)-5-((hexyl)oxy) phenol; 2-hydroxyphenyl-s-triazine derivative; 1,3-bis-((2'-cyano-3',3'-diphenylacryloyl)oxy)-2,2-bis-(((2'-cyano-3',3'-diphenylacryloyl)oxy)methyl)-propane; 2-hydroxy-4-n-octoxybenzophenone; tetra-ethyl-2,2'-(1,4-phenylene-dimethylidene)-bismalonate; 2-tert-butyl-6-(5-chloro-2H-benzotriazol-2-yl)4-methyl-phenone; 2-[2H-benzotriazol-2-yl]-4,6-bis(1-methyl-1-phenylethyl)-phenol; 2,2',4,4'-tetrahydroxybenzo-phenone; or combination thereof.

Embodiment 16. The multilayer tube or the method of forming the multilayer tube of embodiment 14, wherein the metal oxide includes zinc oxide, titanium oxide, cerium oxide, or combination thereof.

Embodiment 17. The multilayer tube or the method of forming the multilayer tube of embodiment 13, wherein the visible light blocking agent comprises an anthroquinone, a benzanthrone, a perinone, a xanthene, an inorganic pigment, a dye, or combination thereof.

Embodiment 18. The multilayer tube or the method of forming the multilayer tube of any of the preceding embodiments, wherein the blocking agent has a degradation temperature of greater than 300° C.

Embodiment 19. The multilayer tube or the method of forming the multilayer tube of any of the preceding embodiments, wherein the multilayer tube has a transparency to visualize fluid flow through the multilayer tube.

Embodiment 20. The multilayer tube or the method of forming the multilayer tube of embodiment 19, wherein the transparency is greater than about 50%, such as greater than 60%, or even greater than 70%, based on percent transmission of a light having a wavelength of 500 nanometers passing through a 1 mm thick sample.

Embodiment 21. The multilayer tube or the method of forming the multilayer tube of any of the preceding embodiments, wherein the multilayer tube has a shore A hardness of 95 or less, such as about 40 to about 90, or even about 40 to about 80.

Embodiment 22. The multilayer tube or the method of forming the multilayer tube of any of the preceding embodiments, wherein the inner layer has a shore A hardness of 95 or less, such as about 40 to about 90, or even about 40 to about 80.

Embodiment 23. The multilayer tube or the method of forming the multilayer tube of any of the preceding embodiments, wherein the fluoropolymer has a nominal polymer fluorine content of at least 67 weight %, such as at least 70 weight %, or even at least 73 weight %.

Embodiment 24. The multilayer tube or the method of forming the multilayer tube of any of the preceding embodiments, wherein the fluoropolymer has a crystallinity of less than about 50%, such as less than about 30%, or even less than about 10%.

Embodiment 25. The multilayer tube or the method of forming the multilayer tube of any of the preceding embodiments, wherein the inner layer has a weight increase in a chemical solution of no greater than 20%, or even no greater than 15% under soak conditions of 28 days at 40° C.

Embodiment 26. The multilayer tube or the method of forming the multilayer tube of any of the preceding embodiments, further including a tie layer adjacent to the inner layer and the outer layer.

Embodiment 27. The multilayer tube or the method of forming the multilayer tube of embodiment 26, wherein the tie layer includes an acrylate, an epoxy, an ester, an ethylene, amine, amide, TFE, VDF, HFP, perfluorovinyl ether, a polyurethane, a styrene-block copolymer, a blend thereof, or combination thereof.

Embodiment 28. The multilayer tube or the method of forming the multilayer tube of any of the preceding embodiments, wherein the inner layer is thinner than the outer layer.

Embodiment 29. The multilayer tube or the method of forming the multilayer tube of any of the preceding embodiments, wherein the outer layer has a shore A hardness of about 95 or less, such as about 40 to about 90, or even about 40 to about 80.

Embodiment 30. The multilayer tube or the method of forming the multilayer tube of any of the preceding embodiments, wherein the inner layer is disposed directly on the outer layer.

Embodiment 31. The multilayer tube or the method of forming the multilayer tube of any of the preceding embodiments, wherein the inner layer, the outer layer, or combination thereof are substantially free of a filler.

Embodiment 32. The multilayer tube or the method of forming the multilayer tube of any of the preceding embodiments, wherein any of the layers further includes a curing agent.

Embodiment 33. The multilayer tube or the method of forming the multilayer tube of embodiment 32, wherein the curing agent includes a dihydroxy compound, a diamine compound, an organic peroxide, a sulfur compound, or combination thereof.

Embodiment 34. The multilayer tube or the method of forming the multilayer tube of any of the preceding embodiments, wherein the multilayer tube is an ink tube, a peristaltic pump tube, a chemically resistant liquid transfer tube, a warewash tube, a laundry tube, or combination thereof.

Embodiment 35. The multilayer tube or the method of forming the multilayer tube of any of the preceding embodiments, wherein the multilayer tube has a minimum bend radius of less than about 0.7 inches.

Embodiment 36. The multilayer tube or the method of forming the multilayer tube of any of the preceding embodiments, wherein the multilayer tube has a maximum force to bend of less than 10 Newtons.

Embodiment 37. A tube includes: at least one layer including a polymer and at least one blocking agent, wherein the polymer includes a fluoropolymer, a polyolefin, a blend thereof, or combination thereof and wherein the at least one blocking agent reduces the percent transmission by at least 99% at wavelengths between 240 nm to 450 nm.

Embodiment 38. The method of embodiment 2, wherein providing the inner layer and the outer layer includes extruding the inner layer and the outer layer.

Embodiment 39. The method of embodiment 38, wherein providing the inner layer and the outer layer includes co-extruding the inner layer and the outer layer.

Embodiment 40. The method of embodiment 2, further including curing the inner layer, the outer layer, or combination thereof.

Embodiment 41. The method of embodiment 2, further including applying a post treatment step including a thermal treatment, a radiation treatment, or combination thereof.

Embodiment 42. The method of embodiment 41, wherein the radiation treatment includes e-beam treatment, gamma treatment, or combination thereof.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

EXAMPLES

Example of Multilayer Tubing

In the case of very aggressive ink components, where there may be concern of pigments or UV-absorbers leaching out of the tubing, it may be desirable to include a thin clear liner or thin clear jacket. In this type of multilayer construction, the clear layers serve as a barrier between the ink and the UV-blocking interior layer to prevent pigment or absorber leaching.

a. For example, a two-layer construction could include wall thicknesses of a 0.030-0.100 inch thick UV-absorbing polyolefin layer with a 0.003-0.015 inch thick clear HDPE liner.

b. Another example of a 2-layer construction could include wall thicknesses of a 0.030-0.100 inch thick UV-absorbing THV layer with a 0.003-0.015 inch clear THV liner.

c. An example of a 3-layer construction could include wall thicknesses of a 0.030-0.100 inch thick UV-absorbing polyolefin layer with a 0.003-0.015 inch thick clear HDPE liner and 0.003-0.030 inch thick clear HDPE jacket.

d. Another example of a 3-layer construction could include wall thicknesses of a 0.030-0.100 inch thick UV-absorbing THV layer with a 0.003-0.015 inch thick clear THV liner and a 0.003-0.030 inch thick clear THV jacket.

Three or five layer tubing constructions may be used in order to pair a fluorinated liner or jacket with a polyolefin UV blocking layer, and include a tie layer for bonding.

a. For example, a three-layer tube could be constructed using a 0.030-0.100 inch thick inch thick UV-absorbing polyolefin tube with a 0.002-0.010 inch thick tie layer and 0.003-0.015 inch thick clear THV liner.

An example of a 5-layer tube is a 0.030-0.100 inch thick UV-absorbing polyolefin tube, two 0.002-0.010-inch thick tie layers on either side, and a 0.003-0.015 inch thick THV jacket and liner.

UV Blocking Test

About 2 inches of translucent polyolefin tubing compounded with both UV-blocking additives and yellow pigment, as well as black tubing and clear tubing as positive and negative control conditions, were filled with photocuring ink, which polymerizes and hardens upon exposure to light between 300-450 nm. The assembly was capped securely on either end with opaque stoppers, such as metal dowel pins, such that light cannot enter the tube from the sides. The assembly was irradiated using a broad spectrum metal halide lamp, whose emission spectrum included bands at 365 nm and 405 nm. The light intensity of the lamp was measured with an optical meter and probe calibrated between 275-450 nm wavelength range. The time of exposure was calculated such that the light exposure dose within this wavelength range was about 16 $J/cm^2$. After exposure, the stoppers were removed and the interior of the tubing was examined for evidence of cured material. The black tubing and the pigmented tubing did not show any evidence of curing or noticeable viscosity change. The interior of the tubing was gently scraped with a foam swab; no evidence of cured skin layers was observed. Conversely, the ink on the inside of the clear tubing had completely solidified. Therefore, the translucent yellow pigmented tubing was observed to have good UV and low-wavelength visible light blocking capabilities.

Soak Test

Seven exemplary materials, including both fluoroelastomers and (nonfluorinated) polyolefin elastomers of various flexural moduli in the form of plaques or extruded tubes, were soaked via full immersion in various diluents at 40° C. for four weeks.

TABLE 1

| Fluorinated materials | |
|---|---|
| Label | Material |
| Fluorinated #1 | Thermoplastic fluoroelastomer |
| Fluorinated #2 | P(TFE-HFP-VDF) |
| Fluorinated #3 | P(TFE-HFP-VDF) with a different monomer ratio than Fluorinated #2 |
| Fluorinated #4 | P(TFE-HFP-VDF) with a different monomer |

TABLE 1-continued

Fluorinated materials

| Label | Material |
|---|---|
| | ratio than Fluorinated #2 and #3 |
| Fluorinated #5 | Fluoroelastomers |
| Fluorinated #6 | ETFE (Ethylene tetrafluoroethylene) |
| Fluorinated #7 | Fluorinated ethylene propylene |

TABLE 2

| Label | Material |
|---|---|
| Non-fluorinated #1 | EPDM |
| Non-fluorinated #2 | Polypropylene (PP) |
| Non-fluorinated #3 | High Density Polyethylene |
| Non-fluorinated #4 | An olefin copolymer |
| Non-fluorinated #5 | An olefin copolymer with a different hardness than Non-fluorinated #4 |
| Non-fluorinated #6 | An olefin copolymer with a different hardness than Non-fluorinated #4 and #5 |
| Non-fluorinated #7 | An olefin copolymer with a different hardness than Non-fluorinated #4, #5 and #6 |
| Non-fluorinated #8 | Polyolefin based dual layer tubing |

Figure 2A:
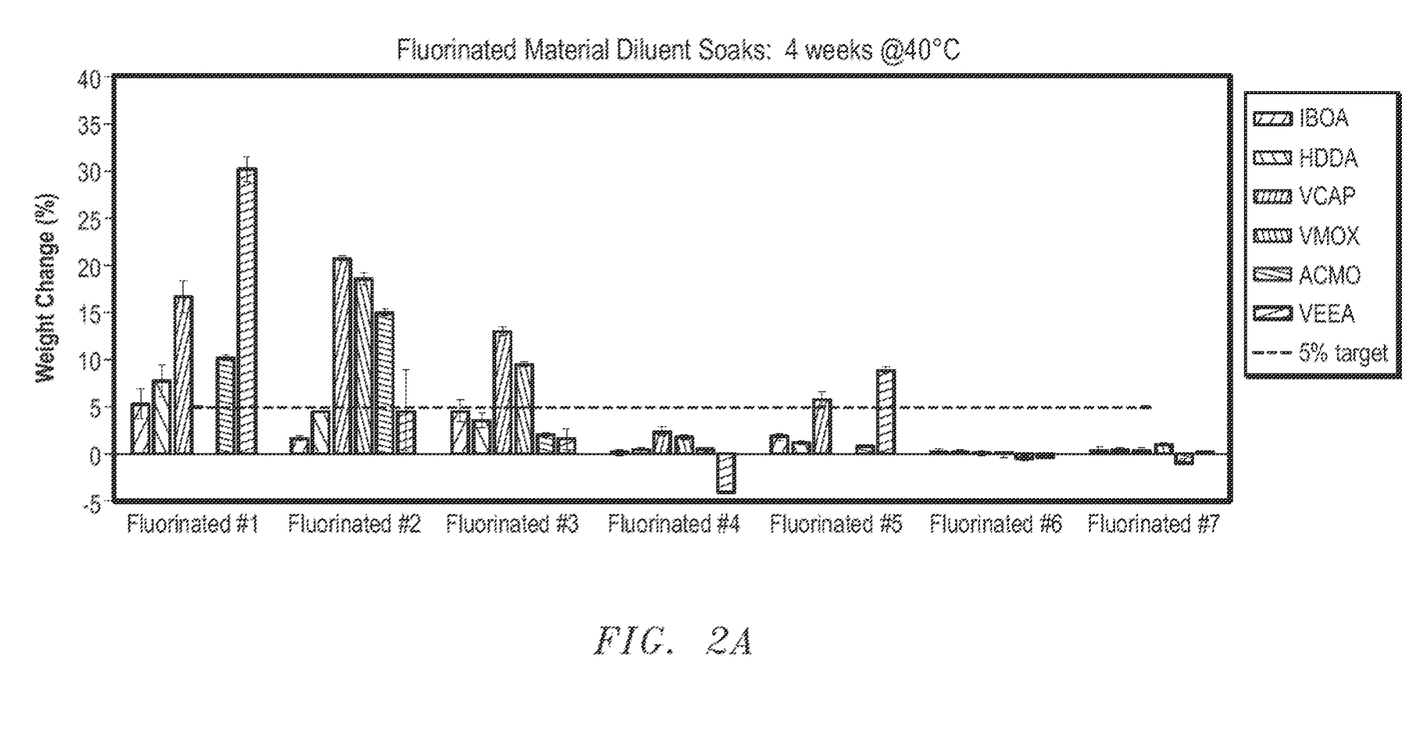
FIG. 2A includes a graphical depiction of exemplary fluorinated material exposed to a soak test.
Figure 2B:
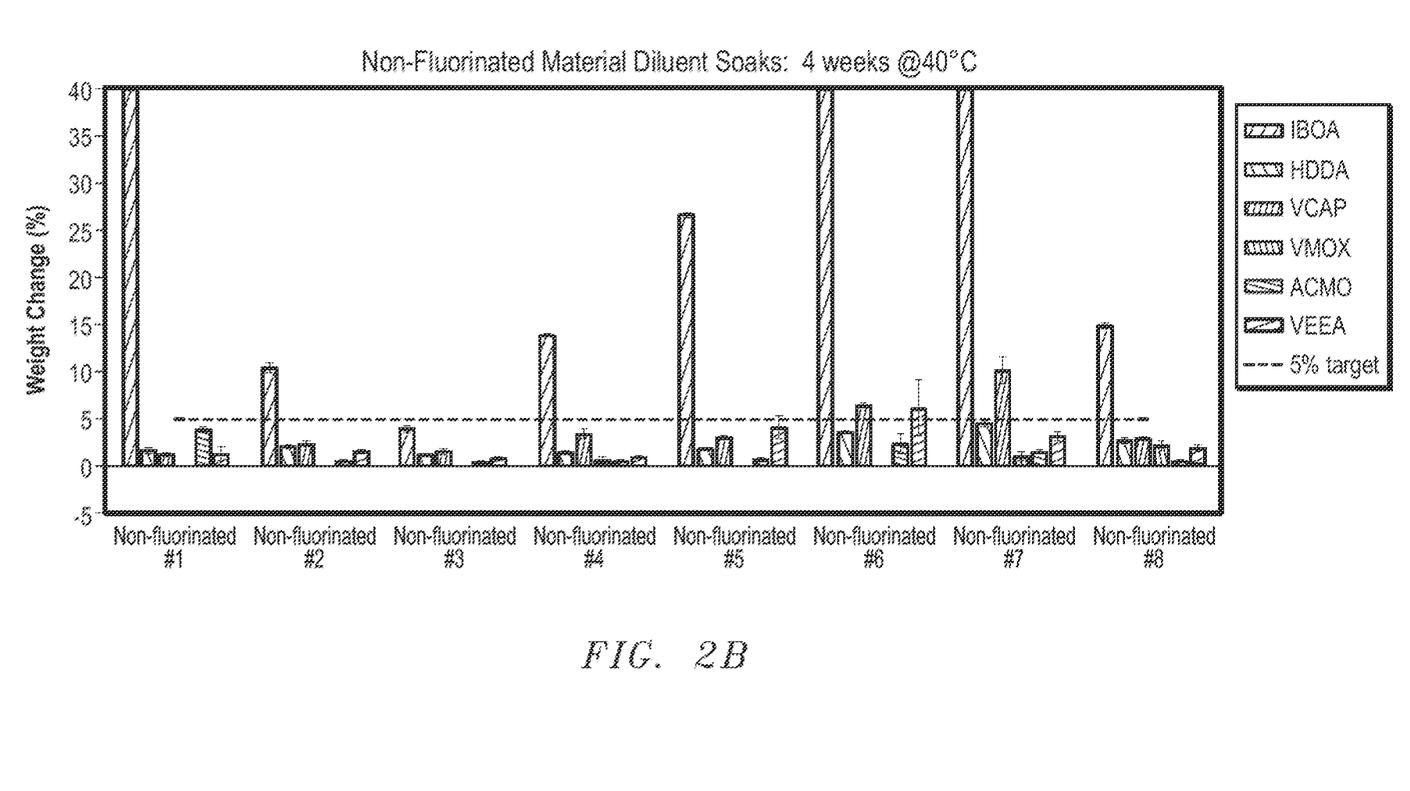
FIG. 2B includes a graphical depiction of exemplary non-fluorinated material exposed to a soak test.

The percent change in weight of the plaques or tubes was recorded as a measure of solvent uptake. Results can be seen in FIGS. 2A and 2B. For non-fluorinated materials, isobornyl acrylate (IBOA) was the most aggressive, while n-vinylcaprolactam (VCAP) tended to have more of an effect on some of the fluoroelastomers. Two of the fluorinated materials (#6 and #7 in FIG. 2A) had the lowest uptake of IBOA, HDDA, or VCAP. One or more of the tubing compositions may be appropriate depending on the use conditions, transfer fluid composition, and cost.

Minimum Bending Radius

Testing was done on a text fixture installed on an Instron instrument. The load cell used was 100N, and the test speed was 40 mm/min. Regarding the minimum bending radius, it was the smallest allowed radius the tubing was allowed to be bent around without kinking it or damaging it. Therefore, the smaller the bend radius, the greater the material flexibility. Therefore, minimum bend radius (MBR) can used to characterize a tubing's flexibility or kink resistance. In the MBR test, the tubing was curved into U-shape and inserted onto grooves of top and bottom platens. The starting distance between platens was recorded. When the testing started, the top platen moved at a certain speed to further bend the tubing. The force as a function of crosshead position was recorded. The bend radius at kink was determined, and the peak force usually occurs when kink happens, which is the maximum bending force.

Figure 3:
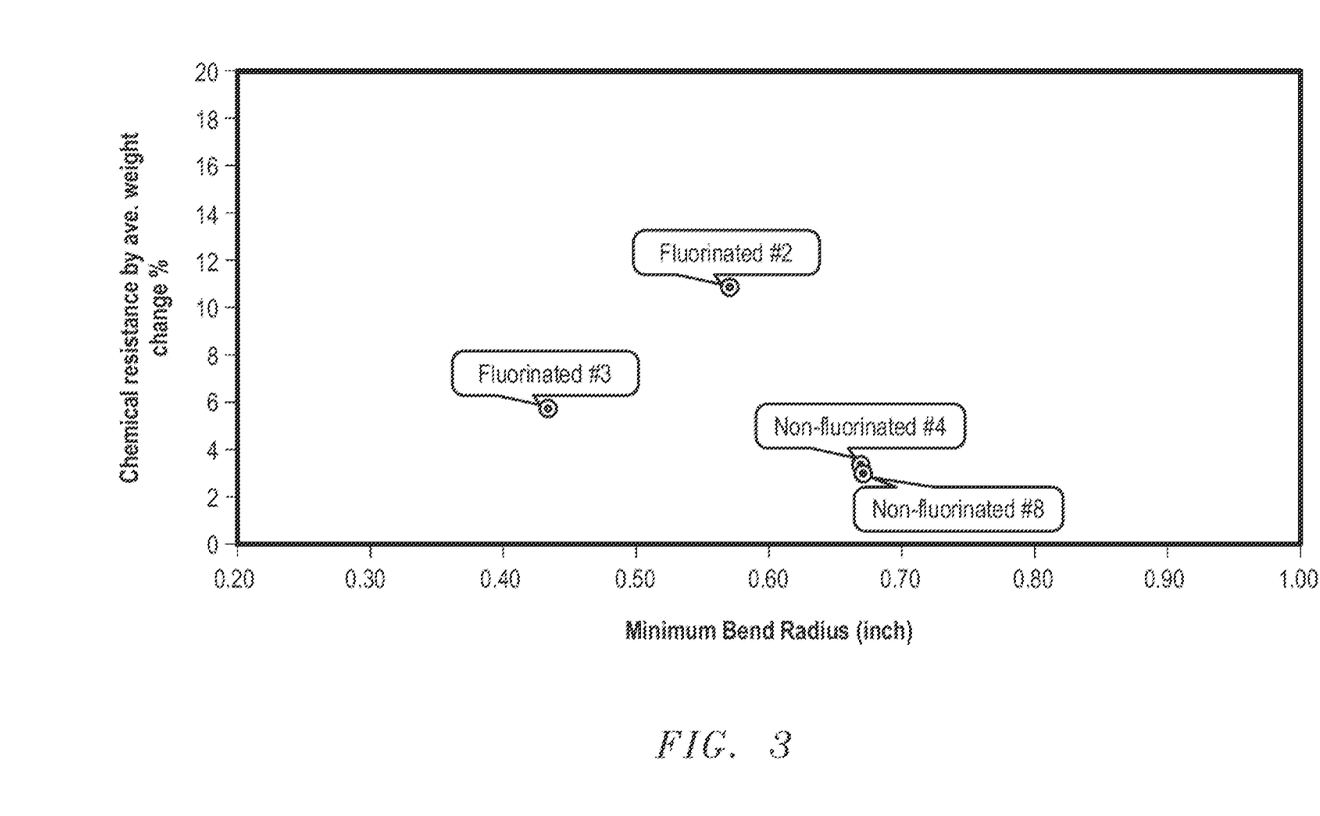
FIG. 3 includes a graphical depiction showing performance of chemical resistance and minimum bend radius for exemplary fluorinated and non-fluorinated materials.
Figure 4:
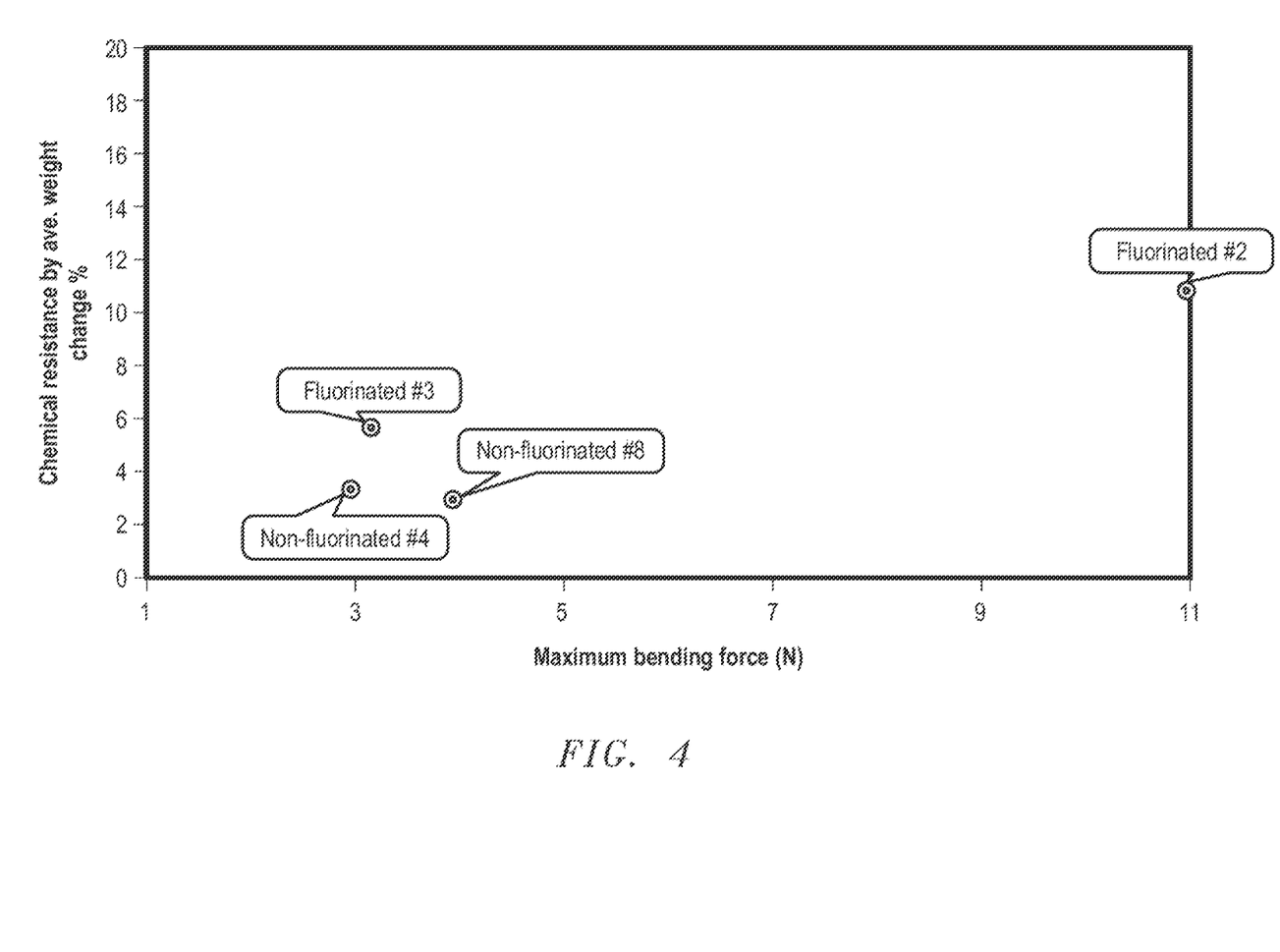
FIG. 4 includes a graphical depiction showing performance of chemical resistance and maximum bending force for exemplary fluorinated and non-fluorinated materials.

FIG. 3 is a graphical depiction of the performance of chemical resistance and minimum bend radius. FIG. 4 is a graphical depiction of the performance of chemical resistance and maximum bending force.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A multilayer tube comprises:
   an inner layer comprising a polymer comprising a fluoropolymer, a polyolefin, a blend thereof, or combination thereof; and
   an outer layer adjacent to the inner layer, wherein the outer layer comprises a polymer comprising a fluoropolymer, a polyolefin, a blend thereof, or combination thereof; wherein the inner layer, the outer layer, or combination thereof comprises at least one blocking agent, wherein the at least one blocking agent reduces the percent transmission of ultraviolet and visible light by at least 99% at wavelengths between 240 nm to 450 nm and wherein the multilayer tube has a maximum force to bend of less than 10 Newtons.

2. The multilayer tube in accordance with claim 1, wherein the fluoropolymer comprises at least one monomer unit comprising tetrafluoroethylene, hexafluoropropylene, chlorotrifluoroethylene, trifluoroethylene, vinylidene fluoride, vinylidene difluoride, vinyl fluoride, perfluoropropyl vinyl ether, perfluoromethyl vinyl ether, or combination thereof; and
   optionally at least one of ethylene, propylene, or any combination thereof.

3. The multilayer tube in accordance with claim 1, wherein the fluoropolymer comprises at least three monomer units, wherein the monomer units comprise vinylidene fluoride, hexafluoropropylene, tetrafluoroethylene, perfluorovinyl ether, ethylene, or combination thereof.

4. The multilayer tube in accordance with claim 3, wherein the fluoropolymer comprises a terpolymer of tetrafluoroethylene (TFE), hexafluoropropylene, and vinylidene fluoride.

5. The multilayer tube in accordance with claim 3, wherein the fluoropolymer comprises a tetrapolymer of tetrafluoroethylene (TFE), hexafluoropropylene, vinylidene fluoride, and ethylene.

6. The multilayer tube in accordance with claim 1, wherein the fluoropolymer has a flex modulus of less than about 40 MPa.

7. The multilayer tube in accordance with claim 1, wherein the polyolefin comprises a monomer comprising a C2-C10 alkene.

8. The multilayer tube in accordance with claim 7, wherein the polyolefin comprises a high density polyethylene, an ultra low density polyethylene, a polyethylene copolymer, a branched polyolefin copolymer, a polypropylene, a blend thereof, or combination thereof.

9. The multilayer tube in accordance with claim 7, wherein the polyolefin is blended with a diene elastomer.

10. The multilayer tube in accordance with claim 1, wherein the at least one blocking agent comprises an ultraviolet blocking agent, a visible light blocking agent, or combination thereof.

11. The multilayer tube in accordance with claim 10, wherein the ultraviolet blocking agent comprises a benzophenone, a benzotriazole, a triazine, an oxanilide, a cyranoacrylate, a metal oxide, or combination thereof.

12. The multilayer tube in accordance with claim 11, wherein the metal oxide comprises zinc oxide, titanium oxide, cerium oxide, or combination thereof.

13. The multilayer tube in accordance with claim 10, wherein the visible light blocking agent comprises an anthroquinone, a benzanthrone, a perinone, a xanthene, an inorganic pigment, a dye, or combination thereof.

14. The multilayer tube in accordance with claim 1, wherein the multilayer tube has a transparency to visualize fluid flow through the multilayer tube.

15. The multilayer tube in accordance with claim 1, wherein the fluoropolymer has a crystallinity of less than about 50%.

16. The multilayer tube in accordance with claim 1, wherein the inner layer has a weight increase in a chemical solution of no greater than 20% under soak conditions of 28 days at 40° C.

17. The multilayer tube in accordance with claim 1, wherein the multilayer tube has a minimum bend radius of less than about 0.7 inches.

18. A tube comprises:

at least one layer comprising at least one blocking agent and a polymer comprising a fluoropolymer having a flex modulus of less than about 40 MPa, a polyolefin, a blend thereof, or combination thereof and wherein the at least one blocking agent reduces the percent transmission of ultraviolet and visible light by at least 99% at wavelengths between 240 nm to 450 nm.

19. A method of forming a multilayer tube comprises:

providing an inner layer comprising a polymer comprising a fluoropolymer, a polyolefin, a blend thereof, or combination thereof; and providing an outer layer adjacent to the inner layer, wherein the outer layer comprises a polymer comprising a fluoropolymer, a polyolefin, a blend thereof, or combination thereof; wherein the inner layer, the outer layer, or combination thereof comprises at least one blocking agent, wherein the at least one blocking agent reduces the percent transmission of ultraviolet and visible light by at least 99% at wavelengths between 240 nm to 450 nm and wherein the multilayer tube has a maximum force to bend of less than 10 Newtons.

* * * * *